Patented Aug. 3, 1954

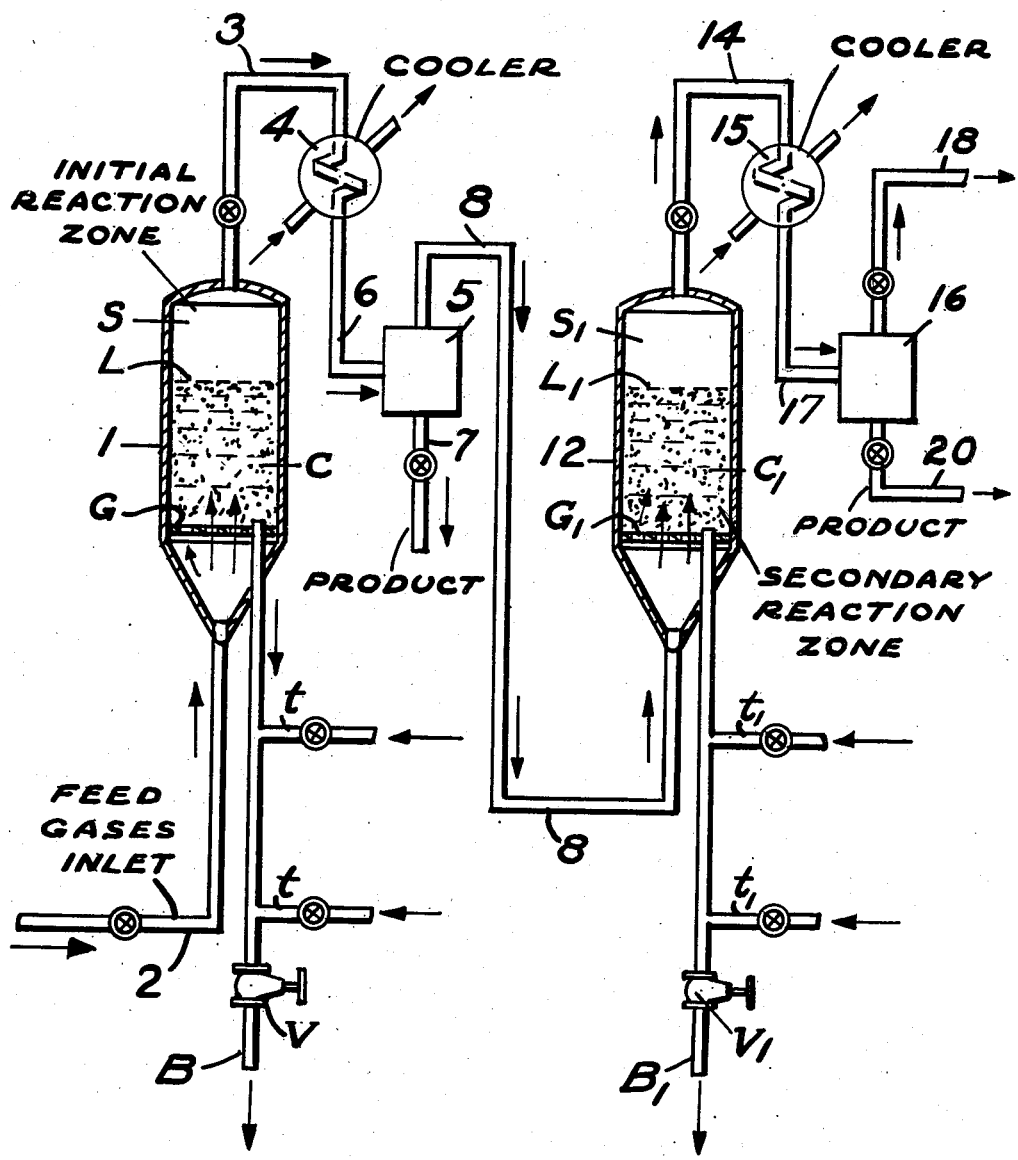

2,685,596

UNITED STATES PATENT OFFICE 2,685,596

TWO-STAGE HYDROCARBON SYNTHESIS PROCESS

Fred J. Buchmann, Baton Rouge, La., assignor to Standard Oil Development Company, a corporation of Delaware Application August 30, 1949, Serial No. 113,223

7 Claims. (Cl. 260—449.6)

The present invention relates to the catalytic reaction between carbon monoxide and hydrogen to form valuable liquid hydrocarbons. More particularly, the present invention is concerned with improvements in the reaction based upon an improved two-stage process for reacting synthesis gas to give high yields of valuable high octane gasoline at low synthesis pressures.

The synthetic production of liquid hydrocarbons from gas mixtures containing various proportions of carbon monoxide and hydrogen is a matter of record, and numerous catalysts, usually containing an iron group metal, have been described which are specifically active in promoting the desired reactions at certain preferred operating conditions. Thus for example, cobalt supported on an inert carrier is used when relatively low pressures of about 1 to 5 atmospheres and low temperatures of about 300°–425° F. and synthesis gas ratios of about 2 mols $H_2$ per mol CO are applied in the manufacture of a substantially saturated hydrocarbon product, while at higher temperatures of 450°–750° F. and higher pressures of 15–40 atmospheres required for the production of unsaturated and branch chained products of high antiknock value, iron-type catalysts are more suitable.

In both cases the reaction is strongly exothermic and the utility of the catalyst declines steadily in the course of the reaction, chiefly due to the deposition of non-volatile conversion products such as paraffin wax, carbon and the like, on the catalyst.

The extremely exothermic character and high temperature sensitivity of the synthesis reaction and the relatively rapid catalyst deactivation have led, in recent years, to the application of the fluid solids technique wherein the synthesis gas is contacted with a turbulent bed of finely divided catalyst fluidized by the gaseous reactants and products. This technique permits continuous catalyst replacement and greatly improves heat dissipation and temperature control.

Most processes for synthesis of hydrocarbons from synthesis gas obtained from coal or natural gas involve the production of relatively pure oxygen for the partial combustion of these raw materials to form CO and $H_2$ which are then reacted in a second step. In order to produce a highly unsaturated hydrocarbon product of high octane value, it is generally considered desirable to operate the synthesis reaction at high pressures of about 400 p. s. i. g. in the presence of an iron catalyst. This, however, involves production of relatively pure oxygen, also at high pressures. It would be uneconomic to employ air at high pressure rather than oxygen because the recycle requirements associated with an iron catalyst would result in the undesirable recirculation of a gas containing an ever-increasing amount of nitrogen.

As indicated above, it would be highly desirable to operate a hydrocarbon synthesis process by the fluid solids technique wherein the synthesis gas is prepared at lower pressures by air instead of by oxygen at high pressures, and wherein the synthesis itself is carried out at moderate instead of at high pressures, and wherein a valuable olefinic motor fuel is obtained. The art shows many attempts in this direction in fixed bed processes. Thus it has been attempted to prepare high octane motor fuel using a thoria promoted cobalt catalyst on a silica gel catalyst. However, it was found that when the variables were adjusted in an effort to improve the yield and quality of product, the yield of liquid products increases somewhat with pressure when the temperature is held constant, but the yield of wax increases also. This is quite undesirable because wax formation renders it extremely difficult to maintain a fluidized bed in the reactor. On the other hand, if the pressure is held constant in the relatively low pressure areas where cobalt catalyst functions well, that is, in the region of 15 to about 75 p. s. i. g., the olefinic content of the product is low, and attempts to increase the olefinicity by increasing the temperature caused a decrease in liquid product yield and an increase in gas formation.

Closely allied with the problem of making high octane gasoline from synthesis gas at low pressure is the composition of the synthesis gas in relation to the catalyst employed. The synthesis of hydrocarbons from CO and $H_2$ follows different courses in accordance with the catalyst used in the synthesis. When a cobalt catalyst is employed, the reaction proceeds substantially as follows:

(1) 
$$2nH_2 + nCO \rightarrow (CH_2)_n + nH_2O$$

Little or no $CO_2$ is formed, and thus it is customary to employ in a cobalt-type synthesis feed, gas compositions in the same proportion as they are consumed in the reaction, i. e. 2 mols $H_2$ per mol CO. When an iron-type catalyst is employed, however, not only does the reaction occur in part as in (1) above, but also $CO_2$ is formed which may be a result of the water gas shift Reaction 2 for which iron is a catalyst, (2) 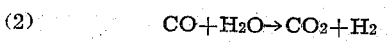
$$CO + H_2O \rightarrow CO_2 + H_2$$

When Reaction 2 occurs to a substantial extent the overall reaction for the iron catalyst process can be represented approximately as follows:

(3) $3nCO + 3nH_2 \rightarrow 2(CH_2)_n + nCO_2 + nH_2O$

Thus in the iron-type process, the synthesis gas constituents are consumed in about equimolar ratios when an approximately 2/1 feed is used.

In the synthesis reaction according to Equation 1 above, the consumption ratio of $H_2$ to CO is 2/1, and this is obtained generally with a cobalt catalyst. However, as indicated, in the presence of an iron catalyst, some of the $H_2O$ formed reacts with some unconverted CO. The latter reaction consumes CO and forms $H_2$ which in effect lowers the $H_2/CO$ consumption ratio. With feeds of less than a 1/1 ratio of $H_2/CO$, the reaction with an iron catalyst approaches $nH_2 + 2nCO \rightarrow (CH_2)_n + nCO_2$ giving an $H_2/CO$ consumption ratio of 0.5/1. Thus the $H_2/CO$ consumption ratio can vary from about 2/1 to almost 0.5/1 depending on the degree to which the water gas shift reaction takes place and to some extent on the feed composition.

In the hydrocarbon synthesis process provisions are generally made to recycle the tail gas in order to utilize the carbon dioxide formed. However, as indicated heretofore, when the synthesis gas is prepared comparatively cheaply from methane or coal by employing air at low pressures instead of by the far more expensive procedures involving pure oxygen, a substantial proportion of inerts, particularly nitrogen, is present in the synthesis gas. In this case, the recycle of tail gas would be a distinctly uneconomic process, because of the large volumes of inerts involved. Thus, it is desirable to employ a once-through process, wherein recycle of tail gas may be dispensed with.

In a once-through hydrocarbon synthesis operation at pressures of 50–100 p. s. i. g. with fluidized catalyst it is highly desirable that the $H_2/CO$ consumption ratio approach as nearly as possible the ratio in which these two constituents are present in the feed. Thus, if the feed gas contains $H_2/CO$ in 1.8–2/1 ratio, as is usual when natural gas or methane is partially oxidized by air or oxygen without recycle of $CO_2$ to the synthesis gas generator, a cobalt catalyst would consume at this ratio, but the product would be paraffinic and of low unsaturation. The synthesis gas prepared by subjecting coal to the water gas reaction or by adding $CO_2$ to a methane oxidation process contains $H_2$ and CO in a 1/1 ratio. If this feed were used with an iron catalyst, it would be consumed at less than a 1/1 ratio, $CO_2$ would be formed, and hydrogen consumption would be low.

It is the principal purpose of the present invention to provide an improved process for a once-through synthesis operation operable at moderate pressures wherein high yields of valuable liquid synthesis products having a high degree of unsaturation may be obtained.

It is also an object of the present invention to provide a two-stage hydrocarbon synthesis process wherein a synthesis gas comprising essentially equal parts of CO and $H_2$ may be essentially completely converted at low pressures into valuable hydrocarbon high octane fuels.

Other objects of the invention will in part be obvious and will in part appear hereinafter.

It has been found in accordance with the present invention that the foregoing objects and advantages may be achieved by carrying out the hydrocarbon synthesis in two or more conversion stages, in which, in the first stage a synthesis gas comprising roughly equimolar ratios of $H_2$ and CO is contacted with a non-water gas shift catalyst such as a cobalt or a cobalt-iron catalyst, and wherein the gas consumption is in the ratio of about 2 mols $H_2$/mol CO, and wherein the effluent gas from this reaction stage is contacted in a second stage with an iron catalyst. Thus when an approximately 1 to 1 feed is passed through a first stage as above, the consumption is approximately 2/1. With a CO conversion in the first stage of about 30–35%, the exit gas from such a first stage has an $H_2/CO$ ratio of about 0.5/1 to 0.6/1 and this is passed into the second (iron) stage, where the consumption ratio is maintained at about 0.5/1, with CO conversions maintained at a high level. In practice, the $H_2/CO$ ratio in the feed may vary from about 0.7/1 to about 1.3/1, and the consumption ratio for the iron catalyst may vary from 0.5/1 to 0.7/1, and for the cobalt catalyst, from 1.7/1 to 2.15/1.

It has been proposed in the past to employ multisynthesis reaction stages, but these not only had the disadvantage of requiring continual changes in pressure and temperature with each stage, but also were not adapted to feed gas compositions produced by coal gasification, etc., wherein the $H_2/CO$ ratio was about 1/1. Thus the surprising result was obtained in operating in accordance with the present invention that when the feed to the first stage (cobalt) is about 1/1, far higher $C_4+$ selectivities and greater unsaturation are obtained than when a 2/1 gas is passed through a cobalt reactor.

The invention will best be understood by referring to the accompanying diagrammatic representation of a modification of the present invention wherein is represented suitable equipment and flow of material for carrying out a preferred embodiment of the invention.

Referring specifically to the drawing, feed gases comprising $H_2$ and CO in the ratio of about 0.7–1.3 mols $H_2$ per mol CO, and which may contain nitrogen diluent in varying proportions, dependent upon the method of synthesis gas preparation, are introduced into reaction zone 1 by means of feed line 2. Reaction zone 1 contains a cobalt catalyst C, or one consisting of both cobalt and iron, and which will be discussed more fully hereinafter. The catalyst is in the form of a powder having a particle size ranging from 0 to 200 microns with the major portion thereof, say 55–65% having a particle size of from about 40 to 80 microns, say 5 to 15% having a particle size of from 0 to 40 microns, and the balance having a particle size of from about 80–200 microns.

The vapors and/or gases which pass through a grid or screen G into reactor 1, are thereafter caused to flow unwardly at a superficial velocity of from about ½ to 1½ feet per second, whereupon a dense, turbulent, ebullient suspension of catalyst in vaporform material is formed. By superficial velocity is meant a velocity measured under the conditions prevailing in the reactor, but assuming no catalyst therein.

Depending on the superficial gas or vapor velocity within the reactor and the amount or mass of catalyst in the reactor, the said dense suspension or "fluidized" mass of catalyst will have an upper dense phase level at L. These conditions of gas velocity and quantity of catalyst in the reactor are adjusted preferably so that there will be a disengaging space S above L. In this space S, the concentration of catalyst in gasiform material decreases upwardly and any catalyst passing into this region flows by gravity toward the dense phase with the result that the main bulk of catalyst is separated from the gasiform material within the reactor. It may be advisable to dispose one or more "cyclones" (not shown) in the upper part of reactor 1 to remove substantially the catalyst entrained in the vapors or gases in this region.

Because of gradually decreasing catalyst activity it is necessary to withdraw and reactivate the catalyst or replace it, at least in part, with freshly prepared or new catalyst. For the purpose of catalyst withdrawal, pipe B, carrying gas taps $t$, is adapted to permit withdrawal of catalyst from reactor 1. A valve V controls the flow of catalyst in draw-off pipe B. With respect to the gas taps $t$, as is known, slow currents of a gas (say CO or $H_2$ or a mixture) may be injected into said pipe B through the taps $t$ for the purpose of facilitating the flow of catalyst therein.

The feed gases are maintained in contact with the cobalt or cobalt-iron catalyst for a sufficient length of time to secure the desired reaction. The reactant gases are eventually withdrawn overhead from reaction zone 1 by means of line 3, cooled in cooling zone 4 and introduced into condensation zone 5 by means of line 6. A reaction product comprising hydrocarbons boiling in the gasoline and fuel oil ranges is withdrawn from zone 5 by means of line 7 and processed in a manner to secure various fractions having the desired specifications.

Uncondensed vapors are withdrawn overhead from zone 5 by means of line 8 and are introduced into secondary reaction zone 12. In secondary reaction zone 12 the vapors are contacted with an iron catalyst $C_1$, under suitable temperature and pressure conditions.

Here also the catalyst is in the form of a powder in dense suspension in the gasiform material fed to this secondary reactor, the entering gasiform material passing first through a foraminous member $G_1$ (similar to G in reactor 1) and then passing upwardly through the reactor at about the same superficial velocity as employed in reactor 1. The proper amount of iron catalyst is maintained in reactor 12 to form an upper dense phase level at $L_1$. As in the case of reactor 1, the reactor 12 is provided with a catalyst draw-off pipe $B_1$ carrying control valve $V_1$ and gas taps $t_1$ for the introduction of a fluidizing gas. The reactor 12 has a catalyst disengaging space $S_1$ between $L_1$ and the top of the reactor for facilitating the separation of catalyst from gasiform material before the latter is withdrawn from the reactor. As in the case of reactor 1, "cyclones" may be disposed in the upper portion of reactor 12 through which gasiform material about to be withdrawn from the reactor is forced to effect substantial separation of entrained catalyst from the gases and/or vapors about to issue from the said reactor.

After a sufficient time of contact the reactant gases are removed overhead from secondary zone 12 by means of line 14, passed through cooling zone 15 and introduced into separation zone 16 by means of line 17. Uncondensed gases are removed overhead from separation zone 16 by means of line 18 and may be sent to the light hydrocarbon recovery system. The condensate comprising hydrocarbon constituents boiling in the gasoline and fuel oil ranges is removed from separation zone 16 by means of line 20 and processed in a manner to secure various fractions of the desired specifications.

The process of the present invention may be widely varied. The process generally comprises synthesizing hydrocarbon constituents, utilizing two reaction zones in which a non-water gas shift catalyst such as cobalt, is employed in the initial zone and an iron catalyst is utilized in the secondary zone. It is essential that when operating in this manner the temperature in the initial zone be maintained in the range of from about 450° to 525° F., preferably in the range of about 475° to 500° F., while the temperatures in the second zone may be in the range of 550° to 650° F., preferably in the range from about 630° to 650° F. It is essential also that the pressure in each zone be in the range from about 50 to 100 p. s. i., preferably in the range from about 55 to 75 p. s. i. When operating in accordance with the present invention, it is also essential that the hydrogen to carbon monoxide ratio in the fresh feed be in the range of from 0.7 to 1.3. The feed rate may be from about 2 to 20 volumes of $H_2+CO$ per pound of catalyst per hour.

The temperature maintained in the condensation or separation zone between the initial and secondary stages may vary appreciably. In general, it is preferred that the temperature maintained in this zone be in the range from about 80° to 120° F., preferably about 100° F.

It is essential that the feed gases introduced into the secondary zone containing the iron catalyst have a hydrogen to carbon monoxide ratio of from about 0.5 to 0.75. In general it is preferred that this ratio be about 0.5. The feed rate in this zone is dependent upon the feed rate to the initial zone and the conversion obtained in the initial zone.

The catalyst employed in the second stage is an iron catalyst and may be prepared by any suitable process. For example, oxides of iron, such as $Fe_3O_4$ or $Fe_2O_3$, are impregnated with a solution of an alkali metal salt, such as the fluoride or the carbonate, or other known promoters, and thereafter the water is evaporated. The promoted oxide is then reduced by treating with hydrogen at a temperature in the range from about 700° to 1100° F. and at pressures in the range from atmospheric to 300 pounds. An iron catalyst supported on some suitable material such as charcoal may be used.

The cobalt catalyst may also be prepared by any suitable known means. For example, cobalt nitrate and thorium nitrate may be mixed with silica hydrogel and dried in a steam oven at about 340° F. The cobalt may be reduced by treating with hydrogen at about 700° F. It is the usual procedure to treat the cobalt catalyst at a high hydrogen rate generally at above 1000 volumes of $H_2$/volume of catalyst per hour, at atmospheric pressure. The catalyst may be supported on any suitable carrier.

The catalyst employed in the first zone may also advantageously comprise Co and Fe promoted by thoria and supported on a siliceous carrier, such as silica gel. The total Co and Fe may vary from about 10 to 35% of the total weight of the catalyst, and the ratio of Co to Fe may vary from about 10/1 to 1/6. It has been found that such a catalyst, in spite of its iron content, gives high $H_2$/CO consumption ratios. Such a catalyst appears to combine the unsaturated product formation characteristics (associated with an iron catalyst) with a 2/1 $H_2$/CO consumption ratio (associated with a cobalt catalyst) without obtaining the wax usually formed with cobalt-type catalysts, thus making this particular catalyst ideal for the first stage of a two stage synthesis process for converting 1:1 $H_2/CO$ gas into valuable high octane gasoline.

The invention may be further illustrated by the following specific examples, which represent fixed bed laboratory data.

Example

This example indicates the superior results obtainable when a 1:1 $H_2/CO$ gas is fed to the first stage of a two-stage conversion process wherein the first stage catalyst is a non-water gas shifting catalyst, such as cobalt or the cobalt-iron composition described above. For comparison, the results obtained with a 2/1 gas are also given.

Catalyst: 14% Co, 14% Fe, 4.4% Th, 67.6% $SiO_2$.
Pressure: 75 p. s. i. g.; temperature: 475° F.; v./v./hr.: 200.

| Feed $H_2/CO$ | CO Conv., Percent Output | $H_2/CO$ Cons. Ratio | $H_2/CO$ in Exit Gas | C4+ Select., cc./m.3 $H_2+CO$ consumed | Est. Unsat., percent in total weathered product |
|---|---|---|---|---|---|
| 1.99 | 64 | 2.07 | 1.74 | 172 | 27 |
| 1.13 | 30 | 2.12 | 0.72 | 194 | 53 |

Thus in the first stage as shown here, not only is there shown to be a superiority in selectivity, but also in product quality when feeding a 1/1 gas to the first stage instead of a 2/1 gas, when the first stage consists of a non-water gas shift catalyst. In the second (iron) stage the exit gas (from the first stage) is converted further to unsaturated liquid products (70–80% unsaturation or higher) at low pressure. If the 1:1 gas had been first passed through a zone wherein gas consumption ratio was 0.5–1:1, a 2/1 gas would have resulted, which would give, on subsequent passage through a cobalt zone, a gasoline product of lower selectivity and inferior quality.

Thus, in accordance with the present invention, once-through hydrocarbon synthesis operations may be advantageously carried out at low pressures with 1:1 gas in a two-stage operation wherein the first stage catalyst comprises a non-water gas shift catalyst and the gas consumption ratio is about 2/1 and wherein in the second stage an iron type catalyst may be employed under approximately similar synthesis conditions, without requiring pressure adjustment between stages, and wherein unsaturated valuable high octane motor fuels are obtained in both stages. By dispensing with high pressure equipment, in the synthesis gas production and in both synthesis stages, investment costs are substantially decreased.

While the foregoing description and exemplary operations have served to illustrate specific applications and results of the invention, other modifications obvious to those skilled in the art are within its scope.

What is claimed is:
1. An improved once-through hydrocarbon synthesis process which comprises contacting at a temperature of from about 450° to about 525° F. and a pressure of from about 50 to about 100 p. s. i. g. synthesis gas comprising hydrogen and carbon monoxide in the mol ratio of from about 0.7 to about 1.3 in an initial stage employing a fluidized cobalt-containing catalyst adapted to the conversion of $H_2$ and CO to valuable liquid hydrocarbons, said catalyst being further characterized in that it does not promote the water gas shift reaction, removing the reactant vapors from said initial stage, separating a condensate, introducing solely the unchanged normally gaseous portion containing hydrogen and carbon monoxide in the ratio of from about 0.5 to 0.75 into a second reaction zone containing a fluidized iron catalyst, maintaining a temperature of from about 550° to about 650° F. and a pressure of from about 50 to about 100 p. s. i. g. in said second zone, and recovering a normally liquid unsaturated product from both zones.

2. The process of claim 1 wherein the catalyst in said first conversion zone is a cobalt catalyst.

3. The process of claim 1 wherein the catalyst in said first conversion zone comprises a mixed iron and cobalt composition supported on a siliceous carrier and promoted with thoria.

4. The process of claim 3 wherein the ratio of cobalt to iron on said catalyst is in the range of 2/1 to 1/2.

5. The process of claim 1 wherein the pressures maintained in both conversion zones are substantially similar.

6. The process of claim 1 wherein the $H_2/CO$ consumption in said first zone is approximately 1.7–2.15/1 and in the second zone is approximately 0.5–0.8/1.

7. The process of claim 1 wherein said synthesis gas contains substantial quantities of nitrogen.

References Cited in the file of this patent

UNITED STATES PATENTS

| Number | Name | Date |
|---|---|---|
| 1,801,382 | Wietzel | Apr. 21, 1931 |
| 2,178,824 | Atwell | Nov. 7, 1939 |
| 2,234,941 | Keith, Jr. | Mar. 11, 1941 |
| 2,244,710 | Kolbel | June 10, 1941 |
| 2,276,274 | Keith, Jr. | Mar. 17, 1942 |
| 2,417,164 | Huber, Jr. | Mar. 11, 1947 |
| 2,434,537 | Barr et al. | Jan. 13, 1948 |
| 2,460,508 | Johnson et al. | Feb. 1, 1949 |
| 2,479,439 | Voorhies, Jr. | Aug. 16, 1949 |
| 2,499,372 | D'Ouville | Mar. 7, 1950 |

FOREIGN PATENTS

| Number | Country | Date |
|---|---|---|
| 515,037 | Great Britain | Nov. 24, 1939 |
| 593,630 | Great Britain | Oct. 22, 1947 |

OTHER REFERENCES

Fischer et al.: The Synthesis of Gasoline by the Fischer-Tropsch Process, Petroleum Refiner, vol. 22, No. 12, December 1943, pages 429–430.